US011724704B2

(12) United States Patent
Hinterberger et al.

(10) Patent No.: US 11,724,704 B2
(45) Date of Patent: Aug. 15, 2023

(54) METHOD AND CONTROL DEVICE FOR DETERMINING AT LEAST ONE CHARACTERISTIC VALUE OF A DRIVETRAIN WHICH IS IN THE INSTALLED STATE IN AN ELECTRICALLY DRIVABLE MOTOR VEHICLE, AND MOTOR VEHICLE

(71) Applicant: AUDI AG, Ingolstadt (DE)

(72) Inventors: Michael Hinterberger, Großmehring (DE); Bernhard Liebhart, Ingolstadt (DE); Christoph Terbrack, Ingolstadt (DE); Christian Endisch, Geisenfeld (DE)

(73) Assignee: AUDI AG, Ingolstadt (DE)

(*) Notice: Subject to any disclaimer, the term of this patent is extended or adjusted under 35 U.S.C. 154(b) by 399 days.

(21) Appl. No.: 16/783,485

(22) Filed: Feb. 6, 2020

(65) Prior Publication Data

US 2020/0269855 A1 Aug. 27, 2020

(30) Foreign Application Priority Data

Feb. 22, 2019 (DE) .......................... 102019202464.5

(51) Int. Cl.
*B60W 40/12* (2012.01)
*B60K 1/00* (2006.01)
(Continued)

(52) U.S. Cl.
CPC ............ *B60W 40/12* (2013.01); *B60K 1/00* (2013.01); *B60K 23/00* (2013.01); *B60W 10/08* (2013.01); *B60W 10/30* (2013.01)

(58) Field of Classification Search
CPC ...... B60W 10/08; B60W 10/30; B60W 40/12; B60K 23/00; B60K 1/00; Y02T 10/70;
(Continued)

(56) References Cited

U.S. PATENT DOCUMENTS 6,177,734 B1* 1/2001 Masberg .............. H02K 11/048
290/40 C
9,496,810 B2* 11/2016 Raichle .................. B60L 50/16
(Continued)

FOREIGN PATENT DOCUMENTS

AT 384 680 B 12/1987
CN 102089963 A 6/2011
(Continued)

OTHER PUBLICATIONS

DE-102008048520-A1 translation (Year: 2010).*
(Continued)

*Primary Examiner* — Angelina Shudy
(74) *Attorney, Agent, or Firm* — Maier & Maier, PLLC

(57) ABSTRACT

A method for determining at least one characteristic value of a drivetrain, which drivetrain is located in the installed state in a motor vehicle that can be partially or fully electrically driven using the drivetrain and has an electrical part having electrical components and a mechanical part having mechanical components. The electrical part and the mechanical part are coupled via an electrical machine. A predetermined mechanical boundary condition for the electrical machine is set by actuating at least one of the mechanical components of the mechanical part and/or using at least one vehicle-external mechanical component. A control device generates an electrical excitation signal in the electrical part by actuating at least one of the electrical components of the electrical part and detects a response signal using a measuring device of the motor vehicle.

16 Claims, 2 Drawing Sheets

(51) Int. Cl.
*B60W 10/30* (2006.01)
*B60W 10/08* (2006.01)
*B60K 23/00* (2006.01)

(58) Field of Classification Search
CPC ....... G01R 31/34; B60L 3/0061; B60L 50/60; G01M 17/007
See application file for complete search history.

(56) References Cited

U.S. PATENT DOCUMENTS

| | | | | |
|---|---|---|---|---|
| 9,673,744 | B2* | 6/2017 | Eberlein | H02P 27/06 |
| 10,355,634 | B1* | 7/2019 | Zhang | G01R 31/346 |
| 2004/0245947 | A1* | 12/2004 | Wilton | B60L 3/0092 |
| | | | | 318/139 |
| 2007/0232442 | A1* | 10/2007 | Jung | B60W 30/1886 |
| | | | | 477/34 |
| 2009/0157251 | A1* | 6/2009 | Niwa | F16H 61/12 |
| | | | | 701/31.8 |
| 2011/0118079 | A1* | 5/2011 | Mueller | B60K 6/387 |
| | | | | 192/3.29 |
| 2011/0264341 | A1* | 10/2011 | Heyl | B60L 15/20 |
| | | | | 701/53 |
| 2012/0038303 | A1* | 2/2012 | Villwock | H02P 21/16 |
| | | | | 318/400.33 |
| 2012/0203408 | A1* | 8/2012 | Migita | B60L 3/0061 |
| | | | | 701/22 |
| 2012/0239348 | A1* | 9/2012 | Banerjee | H02P 23/14 |
| | | | | 702/183 |
| 2013/0311034 | A1* | 11/2013 | Falkenstein | B60W 20/00 |
| | | | | 701/33.7 |
| 2014/0368031 | A1* | 12/2014 | Schmidt | B60L 15/2045 |
| | | | | 307/10.7 |
| 2015/0135863 | A1* | 5/2015 | Dalum | B60K 6/00 |
| | | | | 180/65.21 |
| 2015/0167614 | A1* | 6/2015 | Malone | B60W 10/06 |
| | | | | 701/54 |
| 2015/0377970 | A1* | 12/2015 | Takei | B60W 10/08 |
| | | | | 318/490 |
| 2016/0160470 | A1* | 6/2016 | Kishimoto | B60K 6/365 |
| | | | | 903/910 |
| 2016/0214490 | A1* | 7/2016 | Soo | B60L 58/12 |
| 2016/0339783 | A1* | 11/2016 | Kato | G01R 31/007 |
| 2017/0102425 | A1 | 4/2017 | Hao et al. | |
| 2018/0115269 | A1* | 4/2018 | Lin | G01R 31/007 |
| 2018/0134276 | A1* | 5/2018 | Zhao | B60L 7/26 |
| 2018/0203073 | A1* | 7/2018 | Christensen | G01R 31/389 |
| 2019/0176803 | A1* | 6/2019 | Tabatowski-Bush | B60L 58/12 |
| 2019/0263379 | A1* | 8/2019 | Chikkannanavar | B60W 10/08 |
| 2020/0326375 | A1* | 10/2020 | Camacho Cardenas | |
| | | | | G01M 13/025 |
| 2021/0146909 | A1* | 5/2021 | Serrano | H02P 27/16 |
| 2022/0357413 | A1* | 11/2022 | Hall | G01R 31/67 |
| 2023/0024889 | A1* | 1/2023 | Betro' | H02P 5/50 |

FOREIGN PATENT DOCUMENTS

| | | | | |
|---|---|---|---|---|
| CN | 105934867 A | | 9/2016 | |
| DE | 196 34 366 A1 | | 3/1998 | |
| DE | 10015922 A1 | * | 10/2001 | ............. B62D 5/001 |
| DE | 102008048520 A1 | * | 4/2010 | ............. B60K 17/28 |
| DE | 102011006516 A1 | | 10/2012 | |
| DE | 112012001244 T5 | | 1/2014 | |
| DE | 102015211933 A1 | * | 12/2016 | ............. B60L 3/0061 |
| DE | 102015013016 B4 | * | 4/2017 | |
| DE | 10 2017 007 422 A1 | | 2/2018 | |
| DE | 102017007422 A1 | * | 2/2018 | |
| DE | 102018127457 A1 | * | 5/2020 | |
| EP | 4043346 B1 | * | 3/2023 | ............. B60L 3/0061 |

OTHER PUBLICATIONS

DE-10015922-A1 translation (Year: 2001).*
EP-4043346-B1 translation (Year: 2023).*
Search Report dated Feb. 13, 2020 in corresponding German Application No. 10 2019 202 464.5; 14 pages including partial machine-generated English-language translation.
Office Action dated Mar. 3, 2022, in connection with corresponding Chinese Application No. 202010101765.X (17 pp., including machine-generated English translation).

* cited by examiner

METHOD AND CONTROL DEVICE FOR DETERMINING AT LEAST ONE CHARACTERISTIC VALUE OF A DRIVETRAIN WHICH IS IN THE INSTALLED STATE IN AN ELECTRICALLY DRIVABLE MOTOR VEHICLE, AND MOTOR VEHICLE

FIELD

The disclosure relates to a method for determining a characteristic value of a drivetrain which is already in its installed state in a motor vehicle. The characteristic value refers to at least one component in an electrical part or mechanical part of the drivetrain. The invention also includes a control device with which the method can be performed in a motor vehicle. Finally, the invention also includes a motor vehicle having a drivetrain and the control device according to the invention.

BACKGROUND

The drivetrain of a motor vehicle typically consists of an electrical part with a battery system and a power electronics system for controlling an electrical machine. The electrical machine generates a mechanical torque which drives the connected mechanical part, which extends to the wheels of the motor vehicle.

The electrical machine is controlled by selective actuation of the power electronics system using a closed-loop control system. For this type of control, the parameters of the electrical machine, the battery and the power electronics system must be known, and preferably those of the mechanical part as well. These parameters are typically determined during production. But the parameters of each component may change over time. For example, the parameters of the components can change, on the one hand, due to aging or the current state. On the other hand, spreading faults, such as defective contacts or insulations, may influence the parameters. Many parameters are not, or cannot currently be, determined during operation.

Widespread methods of determining parameters of electrical machines are the short-circuit test and the idling test. These are proven methods of electrical engineering for determining the copper and iron losses in electrical transformers and machines. These two methods are performed once for the characterization of the machine after the production process or whenever defective behavior is suspected. It is currently not possible to perform diagnostics when components are installed in a motor vehicle, i.e. on-board or online diagnostics in an electric vehicle. This means that it is currently not intended that an electrical machine can be diagnosed by means of short-circuit or idling tests.

It is known from US 2017/0102425 A1 to determine a characteristic value of an electrical machine in an electric vehicle in the installed state in that a test current is generated in the electric coils of the electrical machine using the power electronics system. A complex vector control system is needed to prevent the rotor of the electrical machine from starting to rotate. This limits the number of characteristic values which can be determined.

It is known from DE 11 2012 001 244 T5 to determine a condition of a mechanical part of a drivetrain in the installed state using an electrical machine which drives the mechanical part. To this end, the torque profile of the electrical machine is measured and examined for harmonics. This testing method requires that the motor vehicle is traveling. But the selection of excitation signals for testing the mechanical part of the drivetrain is limited to maintain the necessary driving safety.

It is known from DE 10 2011 006 516 A1 to short-circuit the windings of the electrical machine for determining a characteristic value of an electrical machine in a hybrid vehicle. In that publication, this process is called short-circuit mode but it is different from the short-circuit test as known per se. The method described in the publication requires that an additional switching option of the electric windings is created, which increases circuit complexity.

It is the problem of the invention to determine at least one characteristic value in a drivetrain which is already in its installed state in a motor vehicle.

SUMMARY

The invention provides a method for determining at least one characteristic value of a drivetrain. The method is geared to a drivetrain which is already in its installed state in a motor vehicle. The motor vehicle can be driven electrically, which means that the drivetrain has an electrical part with electrical components and a mechanical part with mechanical components. The electrical part and the mechanical part are coupled via an electrical machine. The electrical part is used to electrically supply or drive the electrical machine, the mechanical part is used to transmit the torque generated by the electrical machine to at least one wheel of the motor vehicle. The electrical machine thus represents a connecting link between the electrical part and the mechanical part and may be considered a component of both.

On this basis, the method according to the invention provides that at least one measuring run or measuring attempt or measurement is performed. In the at least one measuring run, initially one of the mechanical components of the mechanical part is actuated and/or at least one vehicle-external component is actuated to set a predetermined mechanical boundary condition for the electrical machine.

This means that the boundary condition is set explicitly for the planned measuring run. The boundary condition does not result from a driver or an autopilot during driving operation. The at least one mechanical component and/or the at least one vehicle-external component is used during the measuring run to maintain the mechanical boundary condition, i.e. the boundary condition is forced. Furthermore, the control device generates an electric excitation signal in the electrical part by actuating at least one of the electric components of the electrical part. The electrical machine is excited by the excitation signal from the electrical part but restricted or confined by the mechanical part due to the mechanical boundary condition. Using a measuring device of the motor vehicle, the control device further detects at least one response signal which can be generated in the drivetrain, i.e. in the electrical part and/or in the mechanical part, as a result of the excitation signal. The control device further determines the at least one characteristic value based on the at least one response signal using a predetermined calculation rule. A response signal which is a characteristic of the characteristic value, that is, depends on the at least one characteristic value, results from confining the electrical machine with respect to the mechanical boundary condition and subsequent excitation of the electrical machine using the excitation signal. The at least one characteristic value can then be determined from the response signal (if the excitation signal and the mechanical boundary condition are known) using a predetermined calculation rule. The calculation rule can to this end generally provide a model and/or a mathematical procedure and/or at least one equation and/or at least one characteristic.

The invention thus utilizes the adjustment option which results using the mechanical part, e.g. by actuating the mechanical components of the mechanical part of the drivetrain themselves to create a mechanical boundary condition for the electrical machine, such that a response signal can be selectively triggered or provoked using an excitation signal from the electrical part and under the prevailing boundary condition, from which response signal the at least one characteristic value can be determined. This results in the advantage that the determination of the at least one characteristic value can also be performed in the installed state of a drivetrain in an electrically drivable motor vehicle. The at least one characteristic value can thus be detected and for example verified or used for calibrating a control without a stop at a repair shop.

The invention also includes embodiments which lead to further advantages.

In principle, every component which can withstand the torque of the motor can be used for securing the rotor of the electrical machine. The component can be placed in the motor vehicle itself (e.g. in the motor) and/or outside the vehicle. The torque can be blocked non-positively (e.g. by a clamp connection) and/or positively (e.g. by interlocking) and/or integrally (e.g. by welding).

In one embodiment, a brake system of the motor vehicle for braking at least one wheel of the motor vehicle is actuated as mechanical component in a measuring run. This blocks a rotation of the electrical machine, that is, of the rotor of the electrical machine, as the mechanical boundary condition. Still, a drive voltage for the electrical machine is generated as an excitation signal. The electrical machine is supplied with a drive voltage from the electrical part using the excitation signal, but it cannot rotate due to the engaged brake system. A machine current of the electrical machine is measured as response signal, and the calculation rule includes a machine equation for a short-circuit test. The machine equation for the short-circuit test is known as such from prior art. This means that the short-circuit test described at the outset is reproduced using the brake system without having to disassemble the electrical machine from the motor vehicle.

Particularly, an electrical armature resistance and/or an electrical rotor resistance and/or a stray inductance and/or a main inductance of the electrical machine are determined. At least one electrical characteristic value of the electrical machine is determined, which can be used for calibrating a closed-loop control system for controlling the electrical machine. The characteristic value to be determined can be selected based on the type of machine.

In one embodiment, a clutch of the motor vehicle for uncoupling the electrical machine from the rest of the mechanical part is opened as mechanical component in a measuring run. As a result, the electrical machine is operated without load, which is the mechanical boundary condition. In other words, the electrical machine is idling, since it cannot transmit a mechanical torque to the mechanical part. A drive voltage for the electrical machine is generated as an excitation signal. The electrical machine is driven by the excitation signal in the form of a drive voltage, i.e. it is accelerated or started. Due to the load free operation, the electrical machine can now be measured electrically and/or mechanically.

In one embodiment, a machine current of the electrical machine is measured as response signal, and the calculation rule includes a machine equation for an idling test. This is the idling test described at the outset, which would typically require a test rig. A machine constant of the electrical machine and/or an armature inductance and/or a stator self-inductance of the electrical machine are determined as the respective characteristic value, wherein the determined characteristic value can depend on a type of the electrical machine. This means that the idling test described can be performed without having to disassemble the electrical machine from the motor vehicle.

In addition or alternatively, a rotational speed of the electrical machine during a startup of a rotor of the electrical machine is measured as the response signal according to one embodiment. The rotor is accelerated at the respective rotational speed. The calculation rule includes a calculation of a mechanical parameter of the electrical machine. By driving the electrical machine without load, a mechanical behavior is exclusively determined by the rotor itself, such that this mechanical behavior can be determined without falsification by other mechanical components of the mechanical part. The rotational speed can be determined in a per se known manner using a rotational speed sensor or rotational speed transmitter. The startup behavior can be used to determine a friction coefficient and/or moment of inertia of the electrical machine.

It has been described how the control device of the motor vehicle itself sets the boundary condition by actuating at least one of the mechanical components of the mechanical part. In one embodiment, the boundary condition is additionally or alternatively generated using at least one vehicle-external or extravehicular mechanical component outside the vehicle (for mechanical blocking or a (toned-down) idling test), rather than using the brake of the vehicle itself. For example, a brake can be used in a test rig and act on at least one tire of the motor vehicle. Instead of the clutch, the rotor of the electrical machine can be placed into "neutral gear" or freewheeling on a test rig in that the at least one wheel of the motor vehicle rotates or is even driven by means of the test rig such that friction resistance and/or moments of inertia due to the drive of the test rig are compensated and the rotor is operated without resistance. In order to compensate influences arising from the inserted mechanical components, a model for evaluating measured signals can be provided in addition or alternatively, for example to exclude or take into account an elasticity or a bending moment of the mechanical part in the case of a blockage and/or a moment of inertia of axles or shafts or wheels in the case of idling. Thus, according to one embodiment, the mechanical part is driven during at least one test run using the at least one vehicle-external mechanical component to compensate friction resistance and/or moments of inertia of the mechanical part and/or by a digital model for evaluating measured signals, which model takes into account an elasticity or a bending moment of the mechanical part and/or a moment of inertia of shafts and/or wheels. Said model can for example be implemented based on a computer program.

The measuring runs described are not the only possible embodiments. For example, the brake system can be activated and a specified torque can be set in the process using the electrical machine like in the first measuring run described, then it can be checked if the torque generated by the electrical machine is greater than the braking torque at a specified and set braking pressure. This can also be seen in that one wheel of the motor vehicle rotates, which can for example be measured based on rotational speed. Thus a braking characteristic of the motor vehicle can be determined for different set braking pressures and the respective adjustment of a torque of the electrical machine.

An electrical excitation signal is necessary for each measuring run. In one embodiment, this excitation signal is generated using a power electronics system which represents an electrical component of the electrical part. The power electronics system can be used to generate an excitation signal which varies over time, starting from a constant direct voltage of a battery system of the motor vehicle. Alternatively, the excitation signal can be produced using switchable battery cells of the battery system itself. In a battery system, the battery voltage can be generated by connecting multiple switchable battery cells in series, wherein the cell terminals in each switchable battery cell may on the one hand be connected via an electrical circuit branch which contains the actual electrochemical cell and via a circuit branch which bridges the electrochemical cell and interconnects the cell terminals directly by a short circuit. The circuit branch having the electrochemical cell is called the cell branch, the circuit branch for bridging the electrochemical cell is called the bypass branch. An electrical switching element may be provided in each of the circuit branches; it may for example be implemented based on a transistor, particularly a field effect transistor. The cell terminals are either interconnected via the cell branch or via the bypass branch, depending on the switching state of the switching elements. Thus the electrochemical cell of the switchable battery cell can be added to the electric circuit of the electrical part by connecting the cell branch, which increases the battery voltage by the cell voltage. If not the cell branch but the bypass branch is inserted between the cell terminals, the battery cell is excluded from the electric circuit (deactivated battery cell). Thus a curve of the excitation signal over time can be set using the battery system itself or by successively adding and removing a single battery cell or a subgroup of battery cells. Thus the excitation signal can be generated directly in the battery system and used to examine both the entire electrical part, starting from the battery system, and the mechanical part for the at least one characteristic value. It is particularly intended to determine a characteristic value of the power electronics system and/or of an electrical component inserted upstream of the power electronic system as viewed from the battery system.

In one embodiment, the mechanical boundary condition is set during a stationary phase of the motor vehicle. Thus a driving behavior of the motor vehicle is not impaired by setting the mechanical boundary condition. The respective measuring run can thus remain unnoticed by the driver. A measuring run can for example also be performed during a parking phase of the motor vehicle, when there is no person in the motor vehicle, for example.

In order to perform the method according to the invention in an electrically driven motor vehicle, the invention provides a control device for controlling the drivetrain of the motor vehicle. The control device comprises a processor device which is configured to perform an embodiment of the method according to the invention. The processor device may comprise to this end at least one microprocessor and/or at least one microcontroller and/or at least one FPGA (field programmable gate array) and/or at least one DSP (digital signal processor) or be implemented using analogous circuits.

The processor device may comprise a program code (software) which has program instructions adapted to perform the method according to the invention when executed by the processor device. The program code may be stored in a data memory of the processor device. The control device may for example be designed as a control unit or as a union of multiple control units.

The invention finally includes a motor vehicle which can be driven electrically and to this end has a drivetrain which comprises an electrical part having electrical components and a mechanical part having mechanical components, wherein the mechanical part and the electrical part are coupled via an electrical machine. A battery system and/or a power electronics system can be provided in the electrical part as a respective component as described above. The mechanical part may comprise, for example, the described clutch and/or a drive shaft and/or a differential and/or a brake system as the respective component. The motor vehicle according to the invention is characterized in that it comprises an embodiment of the control device according to the invention.

The motor vehicle according to the invention is preferably designed as a motor car, particularly a passenger car or truck, or as a bus or motorbike. It may be designed as a hybrid vehicle (partially electrically driven) or an electric vehicle (fully electrically driven).

The invention also includes combinations of the features of the embodiments described.

BRIEF DESCRIPTION OF THE DRAWINGS

Exemplary embodiments of the invention will be described below. Reference will be made to the following figures.

DETAILED DESCRIPTION

Figure 1:
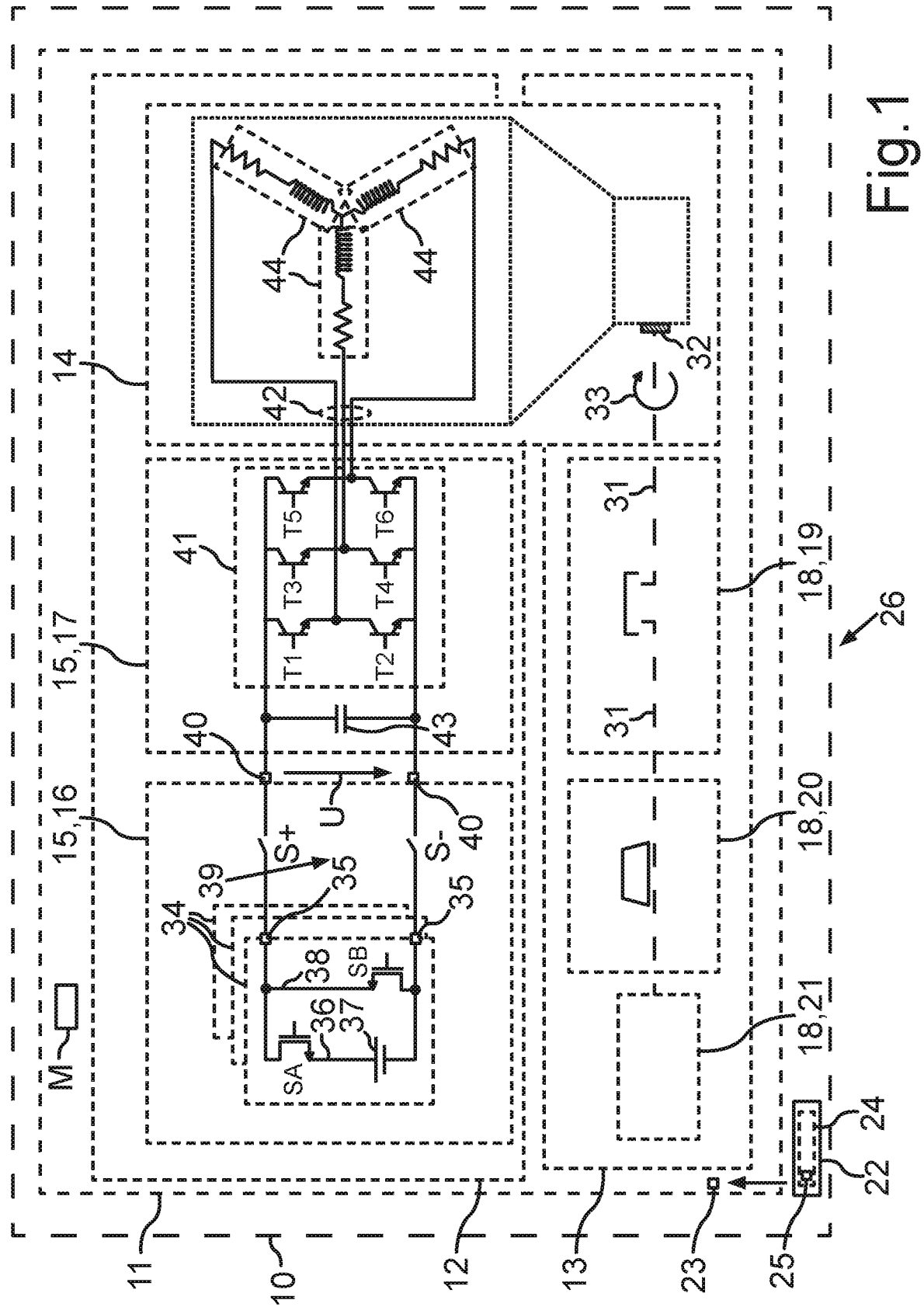
FIG. 1 shows a schematic of an embodiment of the motor vehicle according to the invention.

The exemplary embodiments explained below are preferred embodiments of the invention. The components described in the exemplary embodiment represent individual features of the invention to be viewed separately, independently of each other, each of which further developing the invention independently. The disclosure therefore is to include other than the combinations of features of the embodiments shown. Furthermore, the embodiments described can be supplemented by other features of the features of the invention already described.

Like reference numerals in the figures designate elements having the same function.

FIG. 1 shows a motor vehicle 10, which may be a motor car, particularly a passenger car or truck, or a bus or a motorbike. The motor vehicle 10 is partially or fully electrically drivable and can to this end have a drivetrain 11, which can have an electrical part 12 and a mechanical part 13. The electrical part 12 can be coupled to the mechanical part 13 via an electrical machine 14, which also represents an electromechanical converter and can thus be associated with both the electrical part 12 and the mechanical part 13.

In addition to the electrical machine 14, other electrical components 15 can be provided in the electrical part 12, wherein FIG. 1 shows a battery system 16 as one electrical component 15 and a power electronics system 17 as another electrical component 15.

In addition to the electrical machine 14, the mechanical part 13 may include a mechanical clutch 19, a brake system 20, and at least one wheel 21 which represents a mechanical load as other mechanical components 18.

A control device 22, which can generate control signals 23 for controlling the drivetrain 11, may be provided for controlling the electrical components 15 of the electrical part 12 and the mechanical components 18 of the mechanical part 13. The control device 22 may have a processor device 24.

It can be implemented in the motor vehicle 10 that at least one characteristic value 25, which describes the drivetrain 11 or is characteristic of the drivetrain 11, is determined in the motor vehicle 10 after the drivetrain 11 has already been installed in the motor vehicle 10. Thus the at least one characteristic value 25 can also be determined when the motor vehicle 10 is in operation, for example in a stationary phase 26, for example when it is parked.

The drivetrain 11 may comprise a measuring device M with which at least one electrical variable and/or at least one mechanical variable in the drivetrain 11 can be detected or measured.

Figure 2:
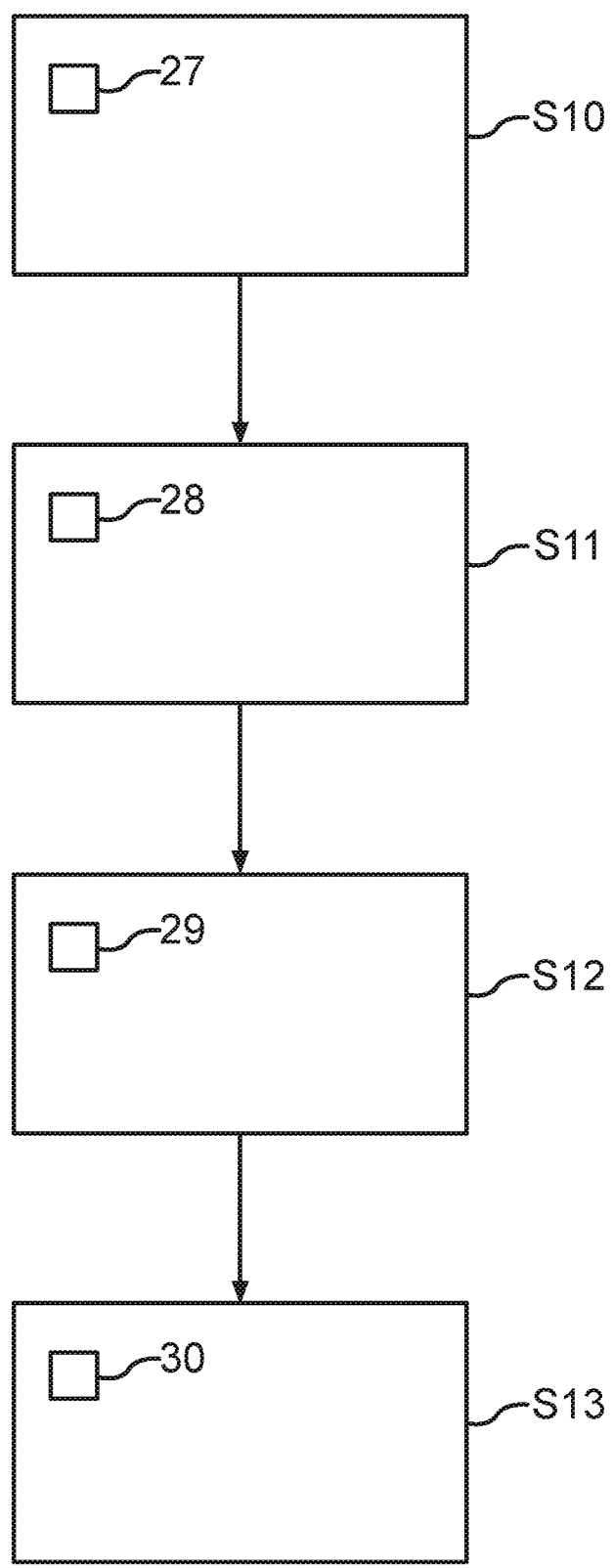
FIG. 2 shows a flow chart illustrating an embodiment of the method according to the invention.

The control device 22 allows the execution of a method which is described below with reference to FIG. 1 and FIG. 2.

The method may provide at least one measuring run, which may include a respective predetermined measurement for the at least one characteristic value 25. In a step S10, the control device 22 can set a predetermined mechanical boundary condition 27 for the electrical machine 14 by actuating at least one of the mechanical components 18 of the mechanical part 13 and keep or force or maintain said boundary condition. In a step S11, the control device can generate an electrical excitation signal 28 in the electrical part 12 by actuating at least one of the electrical components 15 of the electrical part 12.

In a step S12, the control device can detect at least one response signal 29 using the measuring device M, which response signal arises in the drivetrain 11 as a result of the excitation signal 28. The respective response signal can be a measuring signal of the measuring device or a signal derived or determined from a measuring signal of the measuring device. In a step S13, the control device can determine the at least one characteristic value 25 based on the at least one response signal 29 using a predetermined calculation rule 30.

The mechanical boundary condition 27 can for example be set by actuating the brake system 20, whereby drive shafts 31 of the mechanical part 13 can be blocked, which also prevents the rotor 32 of the electrical machine 14 from rotating, even if it generates a mechanical torque 33 in the drive shafts 31. The drive voltage U can be generated as the excitation signal by the battery system 16. The drive voltage U can for example be generated by the battery system 16 based on switchable battery cells 34, groups of which can be connected in parallel in the battery system 16, and then these groups can be connected in series for generating the battery voltage U. The design may also be vice versa in that multiple battery cells 34 are connected in series into strands and that these strands are then connected in parallel. This can be provided for all battery cells 34 or for subgroups thereof.

Each battery cell 34 can have a switchable design in that the cell terminals 35 are interconnected both via a cell branch 36 with the electrochemical cell 37 and via a bypass branch 38, which bypasses the electrochemical cell 37 or bridges it. A switching element SA, SB can respectively be provided in each of the cell branch 36 and the bypass branch 38, by which the respective circuit branch (cell branch 36 and bypass branch 38) can be inserted into an electrical circuit 39 of the electrical part 12. The battery cells 34 can be connected to battery terminals 40 of the battery system 16 using contactors S+, S−, whereby the battery voltage U can be provided to the power electronics system 17.

The power electronics system 17 can for example have a rectifier 41, which can generate an alternating current in electrical phase lines 42 of the electrical machine 14 from a direct current of the battery system 16. To this end, the rectifier 41 may comprise switching elements T1, T2, T3, T4, T5, T6 in a manner known per se, which may be provided based on at least one transistor each. The power electronics system 17 can also comprise an intermediate circuit capacitor 43 in a manner known per se. An alternating current generated in the phase lines 42 based on the battery voltage U and the rectifier 41 can generate a rotating magnetic field in a manner known per se in electrical coils 44 of the electrical machine 14, by which a torque 33 is applied to the rotor 32 which the rotor 32 can transmit to the drive shaft 31. This is not limited to rotating field machines having 3 phases; they can generally have m phases, that is, 2 phases or more than 3 phases (m is greater than or equal to 1). There also is no limitation just to rotating field machines; generally, any type of electrical machine can be used in a similar or known manner (for example a direct current machine, a reluctance machine).

If the drive shaft 31 is blocked in a measuring run in the manner described using the brake system 20, a magnetic effect will act on the electrical coils 44 which can be calculated based on a machine equation and which influences the electrical motor current of the electrical machine 14 in the phase lines 42 and can thus be measured using the measuring device M. This machine equation is known per se from prior art in conjunction with the short-circuit test.

An additional or alternative measuring run may provide that the control device 22 uncouples the rotor 32 from the rest of the mechanical part 13 using the clutch 19, such that the rotor 32 and thus the electrical machine 14 are operated load-free with respect to a mechanical load. If the drive voltage U is then provided via the power electronics system 17 as excitation signal in the electrical machine 14, the torque 33 is completely used to accelerate the rotor 32. The calculation rule 30 can then provide a calculation of at least one characteristic value 25 of the electrical machine 14 based on the machine equation for the electrical machine 14 for the idling test. This machine equation is known per se from prior art in conjunction with the idling test.

The brake or the brake system 20 of the wheels 21 and a mechanical clutch 19 between the electrical machine 14 and the mechanical part 13 can also be used for performing a short-circuit and idling test for the electrical machine 14. Furthermore, an excitation from the battery system 16 can be fed into the electrical circuit 39 of the electrical part 12, which means that the diagnosis of the drive components can be performed in the installed state. It is the possible to check the components in a stationary phase using existing hardware, at the end of the overall production process and during maintenance, as well as fault diagnostics in the installed state.

The technical implementation described has only been illustrated with reference to two detailed examples. The basis is the diagram of FIG. 1. In addition to the electrical components 15 already described above, a respective vehicle 10 also has mechanical components 18, wherein the electrical machine 14 (motor) is the connecting link which ensures that electrical energy is converted into rotational energy.

The motor can be controlled such that it provides a required rotational speed at a defined torque. If a clutch 19 is present, the motor can be mechanically uncoupled from the mechanical part of the drivetrain (down to the tires). The drive shaft 31 can be blocked using a brake 20. A vehicle has a measuring device M with the most varied sensors to detect the electrical and mechanical variables of the drive, among other variables. These are not shown in the diagram for the sake of clarity.

The short-circuit test can generally be used to determine the parameters of the electrical machine by blocking the rotor. Due to a brake (e.g. a parking brake during a parking process), the rotational speed of the machine is zero. In the classic procedure, the terminals of the electrical machine are energized, wherein the excitation depends on the respective type of machine. Machine equations can be used to calculate the parameters of the replacement wiring diagram from sensor values such as current and voltage. This can be the armature resistance for direct current machines and stray or main inductances for asynchronous machines. It should be noted that the most varied excitation signals can be generated by inserting switches at each cell or via the power electronics system. The voltage at the motor can be almost variably set, which provides more options for determining the parameters.

The idling test can be performed much like the short-circuit test. The motor is uncoupled by a clutch, such that no more load moment is applied. The motor is actuated again, that is, supplied by the battery. Without a load, the machine equations become simpler in that the machine constant and the armature inductance can be calculated from current and voltage values for direct current machines. The stator self-inductance can be used for asynchronous machines. Mechanical parameters (friction coefficients) can also be determined from the startup behavior.

Overall, the examples show how the invention can help achieve an excitation of electrical components on the drivetrain and motor parameters can be estimated.

The invention claimed is:

1. A method for determining at least one characteristic value of a drivetrain installed in a motor vehicle which is at least partially electrically driven, comprising:
   conducting at least one measuring run for an electrical machine of the drivetrain, the electrical machine coupling electrical parts of the drivetrain to mechanical parts of the drivetrain, the at least one measuring run comprising:
      actuating at least one mechanical component of the motor vehicle to set and maintain a predetermined mechanical boundary condition for the electric machine;
      generating a drive voltage commanded by a control device of the motor vehicle by controlling at least one of the electrical parts of the drivetrain, the drive voltage resulting in a drive torque being applied to a rotor of the electrical machine; and
      while the drive voltage is being generated, detecting at least one response signal which results using a measuring device of the motor vehicle, and
   determining the at least one characteristic value of the drivetrain based on the at least one response signal using a predetermined calculation rule,
   wherein the predetermined mechanical boundary condition is set and maintained by actuating a brake system of the motor vehicle to brake at least one wheel of the motor vehicle,
   wherein the at least one response signal comprises a measured machine current of the electrical machine, and
   wherein the predetermined calculation rule includes one or more equations for a short-circuit test.

2. The method according to claim 1, wherein the at least one characteristic value determined is at least one of an electrical armature resistance, an electrical rotor resistance, a stray inductance, and a main inductance of the electrical machine.

3. The method according to claim 1, wherein the electrical parts of the drivetrain comprise a power electronics system which is used to generate the drive voltage,
   wherein the drive voltage is generated using switchable battery cells, and
   wherein a curve of the drive voltage over time is set by successively adding or removing one or more of the switchable battery cells to an electrical circuit of the power electronics system.

4. The method according to claim 1, wherein the predetermined mechanical boundary condition is set and maintained during a stationary phase of the motor vehicle.

5. A motor vehicle which is at least partially electrically driven and which comprises a drivetrain and a control unit, the control unit comprising at least a processor device which is configured to carry out the method according to claim 1.

6. A method for determining at least one characteristic value of a drivetrain installed in a motor vehicle which is at least partially electrically driven, comprising:
   conducting at least one measuring run for an electrical machine of the drivetrain, the electrical machine coupling electrical parts of the drivetrain to mechanical parts of the drivetrain, the at least one measuring run comprising:
      actuating at least one mechanical component of the motor vehicle to set and maintain a predetermined mechanical boundary condition for the electric machine;
      generating a drive voltage commanded by a control device of the motor vehicle by controlling at least one of the electrical parts of the drivetrain, the drive voltage resulting in a drive torque being applied to a rotor of the electrical machine; and
      while the drive voltage is being generated, detecting at least one response signal which results using a measuring device of the motor vehicle, and
   determining the at least one characteristic value of the drivetrain based on the at least one response signal using a predetermined calculation rule,
   wherein the predetermined mechanical boundary condition is set and maintained by opening a clutch of the drivetrain to allow the electrical machine to operate without load.

7. The method according to claim 6, wherein the at least one response signal comprises a measured machine current of the electrical machine,
   wherein the predetermined calculation rule includes one or more equations for an idling test, and
   wherein the at least one characteristic value determined is at least one of a machine constant, an armature inductance, and a self-inductance of a stator of the electrical machine.

8. The method according to claim 6, wherein the at least one response signal comprises a measured rotational speed of the electrical machine during a startup of the rotor, and wherein the at least one characteristic value determined comprises a mechanical parameter of the electrical machine.

9. The method according to claim 6, wherein the electrical parts of the drivetrain comprise a power electronics system which is used to generate the drive voltage,
wherein the drive voltage is generated using switchable battery cells, and
wherein a curve of the drive voltage over time is set by successively adding or removing one or more of the switchable battery cells to an electrical circuit of the power electronics system.

10. The method according to claim 6, wherein the predetermined mechanical boundary condition is set and maintained during a stationary phase of the motor vehicle.

11. A motor vehicle which is at least partially electrically driven and which comprises a drivetrain and a control unit, the control unit comprising at least a processor device which is configured to carry out the method according to claim 6.

12. A method for determining at least one characteristic value of a drivetrain installed in a motor vehicle which is at least partially electrically driven, comprising:
conducting at least one measuring run for an electrical machine of the drivetrain, the electrical machine coupling electrical parts of the drivetrain to mechanical parts of the drivetrain, the at least one measuring run comprising:
actuating at least one vehicle-external mechanical component to at least partially set and maintain a predetermined boundary condition for the electric machine;
generating a drive voltage commanded by a control device of the motor vehicle by controlling at least one of the electrical parts of the drivetrain, the drive voltage resulting in a drive torque being applied to a rotor of the electrical machine; and
while the drive voltage is being generated, detecting at least one response signal which results using a measuring device of the motor vehicle, and
determining the at least one characteristic value of the drivetrain based on the at least one response signal using a predetermined calculation rule,
wherein the vehicle-external mechanical component is located outside the vehicle.

13. The method according to claim 12, wherein the vehicle-external mechanical component is used to compensate for at least one of friction and moments of inertia, and
wherein the vehicle-external mechanical component is operated according to a model for evaluating measured signals, the model considering for one or more of the mechanical parts of the drivetrain at least one of elasticity, bending moments, and moments of inertia.

14. The method according to claim 12, wherein the electrical parts of the drivetrain comprise a power electronics system which is used to generate the drive voltage,
wherein the drive voltage is generated using switchable battery cells, and
wherein a curve of the drive voltage over time is set by successively adding or removing one or more of the switchable battery cells to an electrical circuit of the power electronics system.

15. The method according to claim 12, wherein the predetermined mechanical boundary condition is set and maintained during a stationary phase of the motor vehicle.

16. A motor vehicle which is at least partially electrically driven and which comprises a drivetrain and a control unit, the control unit comprising at least a processor device which is configured to carry out the method according to claim 12.

* * * * *